United States Patent
Park

(10) Patent No.: US 7,725,436 B1
(45) Date of Patent: May 25, 2010

(54) METHOD AND SYSTEM FOR REDUCING THE NUMBER OF READ-ONLY, PERSISTENT POINT-IN-TIME IMAGES ON A STORAGE SERVER

(75) Inventor: Collin Y. Park, Redwood City, CA (US)

(73) Assignee: Network Appliance, Inc,, Sunnyvale, CA (US)

( * ) Notice: Subject to any disclaimer, the term of this patent is extended or adjusted under 35 U.S.C. 154(b) by 254 days.

(21) Appl. No.: 11/332,188

(22) Filed: Jan. 12, 2006

(51) Int. Cl.
*G06F 7/00* (2006.01)
*G06F 17/00* (2006.01)

(52) U.S. Cl. .................. 707/639; 707/649; 707/664

(58) Field of Classification Search .......... 707/200, 707/203, 206
See application file for complete search history.

(56) References Cited

U.S. PATENT DOCUMENTS

| | | | | |
|---|---|---|---|---|
| 5,794,242 A * | 8/1998 | Green et al. | ............ | 707/10 |
| 5,819,292 A | 10/1998 | Hitz et al. | | |
| 6,604,118 B2 * | 8/2003 | Kleiman et al. | ............ | 707/203 |
| 6,748,504 B2 * | 6/2004 | Sawdon et al. | ............ | 711/162 |
| 6,779,003 B1 * | 8/2004 | Midgley et al. | ............ | 707/204 |
| 6,889,228 B1 * | 5/2005 | Federwisch | ............ | 707/102 |
| 7,392,356 B1 * | 6/2008 | Hardman | ............ | 711/162 |
| 7,464,116 B2 * | 12/2008 | Sarma et al. | ............ | 707/201 |
| 2002/0116402 A1 * | 8/2002 | Luke | ............ | 707/200 |
| 2003/0158862 A1 * | 8/2003 | Eshel et al. | ............ | 707/200 |
| 2003/0220944 A1 * | 11/2003 | Schottland et al. | ............ | 707/203 |
| 2005/0065986 A1 * | 3/2005 | Bixby et al. | ............ | 707/204 |

OTHER PUBLICATIONS

Christian Odhner, "SnapVault Deployment and Configuration," Mar. 2003, 19 pages, TR-3240, Network Appliance, Inc., Sunnyvale, California.

Veritas Software and Network Appliance, "Using Netbackup Data Center and Netbackup Vault with Nearstore Appliances," 2002, 13 pages, Network Appliance, Inc., Sunnyvale, California.

* cited by examiner

*Primary Examiner*—James Trujillo
*Assistant Examiner*—Marc Somers
(74) *Attorney, Agent, or Firm*—Blakely, Sokoloff, Taylor & Zafman LLP

(57) ABSTRACT

A plurality of read-only, persistent point-in-time images (RPPIs) of a file system are maintained on a storage server. Each of these RPPIs is created to capture an update of the file system. The file system has at least one subset. If, for each subset of the file system, the file system has an RPPI, other than a first RPPI, having a corresponding subset identical to the first RPPI's corresponding subset, the first RPPI may be deleted, yet all updates captured by the first RPPI are still maintained by other RPPI or RPPIs.

12 Claims, 5 Drawing Sheets

METHOD AND SYSTEM FOR REDUCING THE NUMBER OF READ-ONLY, PERSISTENT POINT-IN-TIME IMAGES ON A STORAGE SERVER

FIELD OF THE INVENTION

At least one embodiment of the present invention pertains to storage server management, and more particularly, managing the number of historical backups of a file system.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In file servers, data is stored in logical containers called volumes, which may be identical with, or proper subsets of, aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A "file system" is an independently managed, self-contained, hierarchal set of data units (e.g., files, blocks or LUNs). Although a volume or file system (as those terms are used herein) may store data in the form of files, that is not necessarily the case. That is, a volume or file system may store data in the form of other units, such as blocks or LUNs.

A storage server may maintain one or more write-out-of-place file systems. In a write-out-of-place file system, whenever a data block is modified, it is written to a new physical location on disk. This is in contrast with a write-in-place approach, where a data block, when modified, is written in its modified form back to the same physical location on disk. An example of file system software that implements write-out-of-place is the WAFL® file system software included in the Data ONTAP® storage operating system of NetApp.

One feature which is useful to have in a storage server is the ability to create a read-only, persistent, point-in-time image (RPPI) of a data set, such as a volume or a LUN, including its metadata. This capability allows the exact state of the data set to be restored from the RPPI in the event of, for example, data corruption or accidental data deletion. The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™ generated by SnapDrive™ or SnapManager® for Microsoft® Exchange software, both made by NetApp. Unlike other RPPI implementations, NetApp Snapshots do not require duplication of data blocks in the active file system, because a Snapshot can include pointers to data blocks in the active file system.

An example of an RPPI technique which does not require duplication of data blocks to create an RPPI is described in U.S. Pat. No. 5,819,292, which is incorporated herein by reference, and which is assigned to NetApp. The described technique of creating an RPPI (e.g., a Snapshot) does not require duplication of data blocks in the active file system, because the active file system can include pointers to data blocks in an RPPI, for any blocks that have not been modified since the RPPI was created. (The term "Snapshot" is used in this document without derogation of Network Appliance, Inc.'s trademark rights.) Among other advantages, this technique allows an RPPI to be created quickly, helps to reduce consumption of storage space due to RPPIs, and reduces the need to repeatedly update data block pointers as required in some prior art RPPI techniques.

Write out-of-place technology allows for efficient operation of a backup process through use of the RPPI technique discussed above. As shown in FIG. 1, a storage server 2 implemented with write out-of-place file systems may serve as a backup server. Backing up of a file system (i.e., a volume, LUN, etc.) or a subset thereof on a primary storage system 1 (hereinafter "primary server") starts with the step of completely copying the data of the file system or subset on the primary server 1 to the backup server 2. This initial, or baseline, transfer may take some time to complete, as it is duplicating the entire source data set on the backup server 2 much like a full backup to tape. When the initial full backup is performed, the backup server 2 creates an RPPI of the volume just copied over. Each subsequent backup transfers only the data blocks which have changed since the previous backup. The backup server 2 receives these data blocks, updates its volume, and creates a new RPPI. This backup mechanism is called a block-level incremental backup process. An example of such a backup system is the SnapVault® system of NetApp.

A shortcoming with the above backup mechanism is that there can be too many RPPIs created on the backup server, because each time an update occurs on the backup server, the backup server needs to create an RPPI. However, the number of RPPIs a backup server can maintain is limited by design or physical considerations (e.g., available storage space). This shortcoming can be overcome by coordinating backups from all primary servers such that they occur at the same frequency on similar schedules. Then, a single RPPI can be taken to capture the changed data in all backups. This is the approach taken by NetApp's SnapVault system. This approach, however, requires the coordination and loses the flexibility of a backup system. Thus, another way is needed to reduce the number of RPPIs created on the backup server, yet still ensure that each and every update of a backup server is captured.

SUMMARY OF THE INVENTION

The present invention includes a method and processing system for reducing the number of read-only, persistent point-in-time images on a storage server. The method comprises maintaining a plurality of read-only, persistent point-in-time images (RPPIs) of a file system. Each RPPI is created upon an update of the file system. The file system comprises at least one subset. The method further comprises deleting a first RPPI from the plurality of RPPIs of the file system upon a determination that, for each subset of the file system, the file system has another RPPI having a corresponding subset identical to the first RPPI's corresponding subset.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4(a) is the first one of five figures showing an example of an application of the present invention on a backup server;

FIG. 4(b) is the second one of five figures showing an example of an application of the present invention on a backup server;

FIG. 4(c) is the third one of five figures showing an example of an application of the present invention on a backup server;

FIG. 4(d) is the fourth one of five figures showing an example of an application of the present invention on a backup server;

FIG. 4(e) is the fifth one of five figures showing an example of an application of the present invention on a backup server.

DETAILED DESCRIPTION

A method and system for reducing the number of RPPIs created for a file system on a storage server are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The present invention includes a technique to reduce the number of RPPIs created for a file system on a storage server, while still ensuring that each historical version of the file system immediately after any update is preserved. According to the technique, every time an update of a file system on the storage server takes place, an RPPI is created to capture the newly updated file system. This step is called "to capture an update of a file system". Then, the newly created RPPI is compared with a previous RPPI to determine whether any previous update captured by the previous RPPI is also captured by the newly created RPPI. If so, the previous RPPI may be deleted safely since any update which is supposed to be recorded by and recoverable from the previous RPPI is also recorded by and recoverable from the newly created RPPI. The rationale is that an RPPI may be deleted only when all update/updates captured by it is/are also captured by other RPPI or RPPIs.

The aforementioned technique may also be used to reduce the number of RPPIs retained for a file system on a storage server whenever one historical version of the file system or a subset thereof is "deleted", i.e., declared no longer required to be kept for purpose of future recovery.

The Incremental Backup Process with Softlock Added

Figure 2:
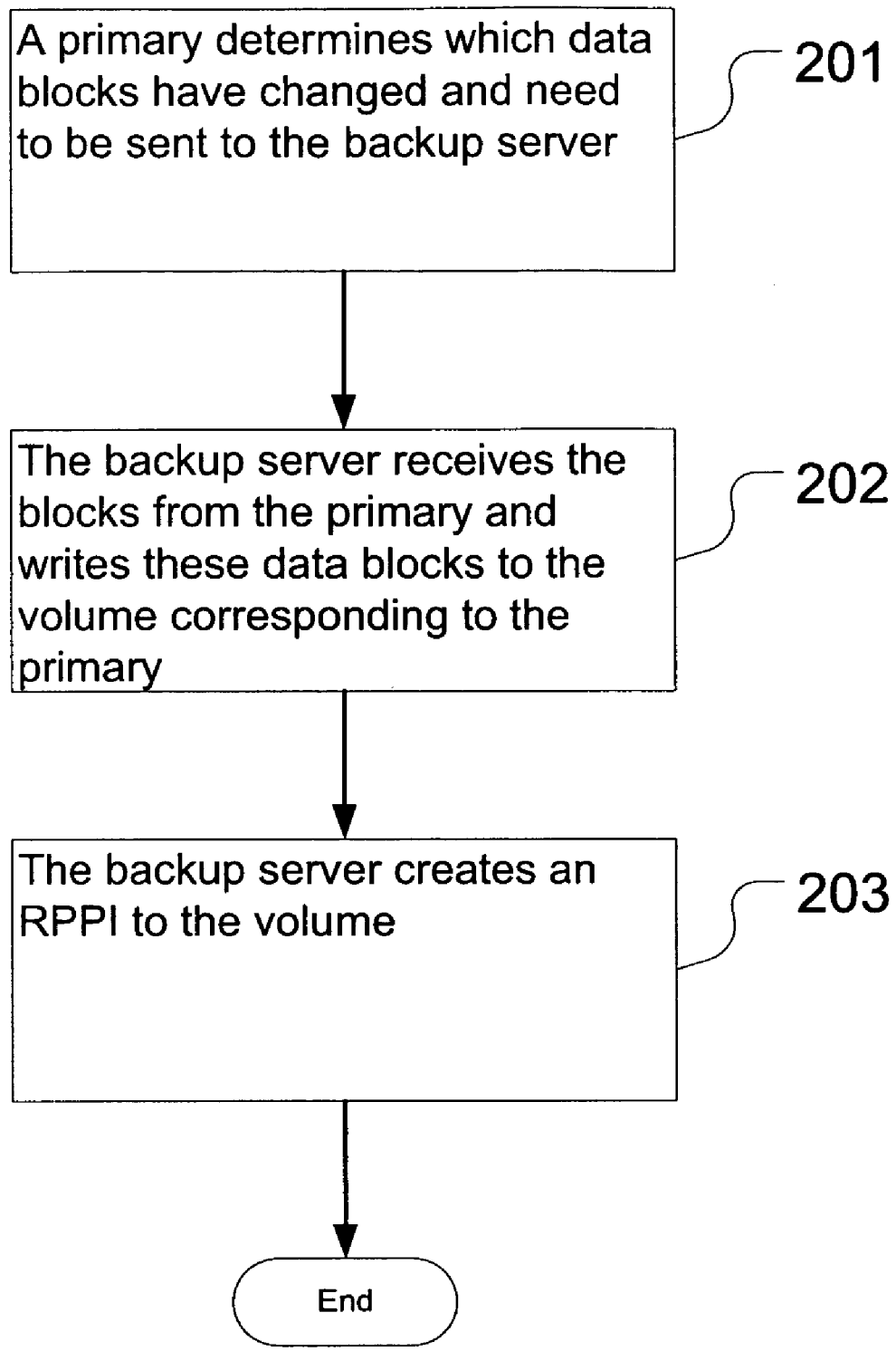
FIG. 2 is a flow diagram illustrating the detail of an incremental backup process on a backup server with softlock added.

Incremental backup refers to the technique that only the data blocks of a primary server that have changed since a most recent previous backup of the primary server are transmitted to a backup server for a new backup operation. FIG. 2 is a flow diagram illustrating the detail of an incremental backup process on a backup server with softlock added. A softlock is a data structure used to "lock" a dataset to prevent the dataset from being removed or modified. Information may be added in a softlock to indicate other aspect with respect to the "locked" dataset, i.e., information indicating that the dataset was just updated. At block 201, a primary server (e.g., a Unix Server, Windows Server, a NetApp filer, etc.) determines which data blocks have changed and need to be sent to the backup server (e.g., a NetApp filer). At block 202, the backup server receives the changed blocks from the primary server and writes these data blocks to the volume corresponding to the primary server. A volume may be considered as being logically subdivided into several sub-volumes. Each sub-volume may be a sub-directory directly under the volume's root directory. For example, directory "root/home", a sub-directory directly under the root directory of a volume, may be considered as a sub-volume of the volume. Thus, an update of the volume may affect only some of the sub-volumes. At block 203, the backup server creates an RPPI of the volume. In an embodiment, the implementation includes creating a softlock corresponding to the update of each sub-volume. Each softlock is attached to the version of the sub-volume in the particular RPPI just created to capture the new update, indicating that the sub-volume to which the corresponding softlock is attached was updated and the updated version of the sub-volume is included in the RPPI just created. To simplify this description, just like a sub-volume of a volume (or a subset of a file system), its counterpart in an RPPI may be called a sub-volume (or a subset) of the RPPI. A softlock is conceptually a record-keeping device, with the semantics "RPPI (x) is required because of version (y) of sub-volume (z)". As such, a softlock may be implemented as including data which uniquely identifies the particular RPPI and sub-volume to which the softlock is "attached", and may be maintained, by way of illustration and not restriction, in an external database, in a flat file, physically residing on the same volume as the data and the RPPIs the softlock refers to, or in a flat file physically residing in another volume on the same storage server, etc. Note that the term "attach" or "attached" does not require that a softlock be physically associated with a sub-volume of an RPPI. Logical association by means of including data in a softlock for identifying the particular sub-volume in an RPPI to which the softlock is attached is one example of softlock implementation.

Process to Reduce the Number of RPPIs

The criterion of the process to reduce the number of RPPIs created for a file system is that an RPPI may be deleted only if each subsystem of RPPI has an identical corresponding subsystem in another RPPI. The technique described here is applicable to any storage server, not just to a backup server.

Figure 3:
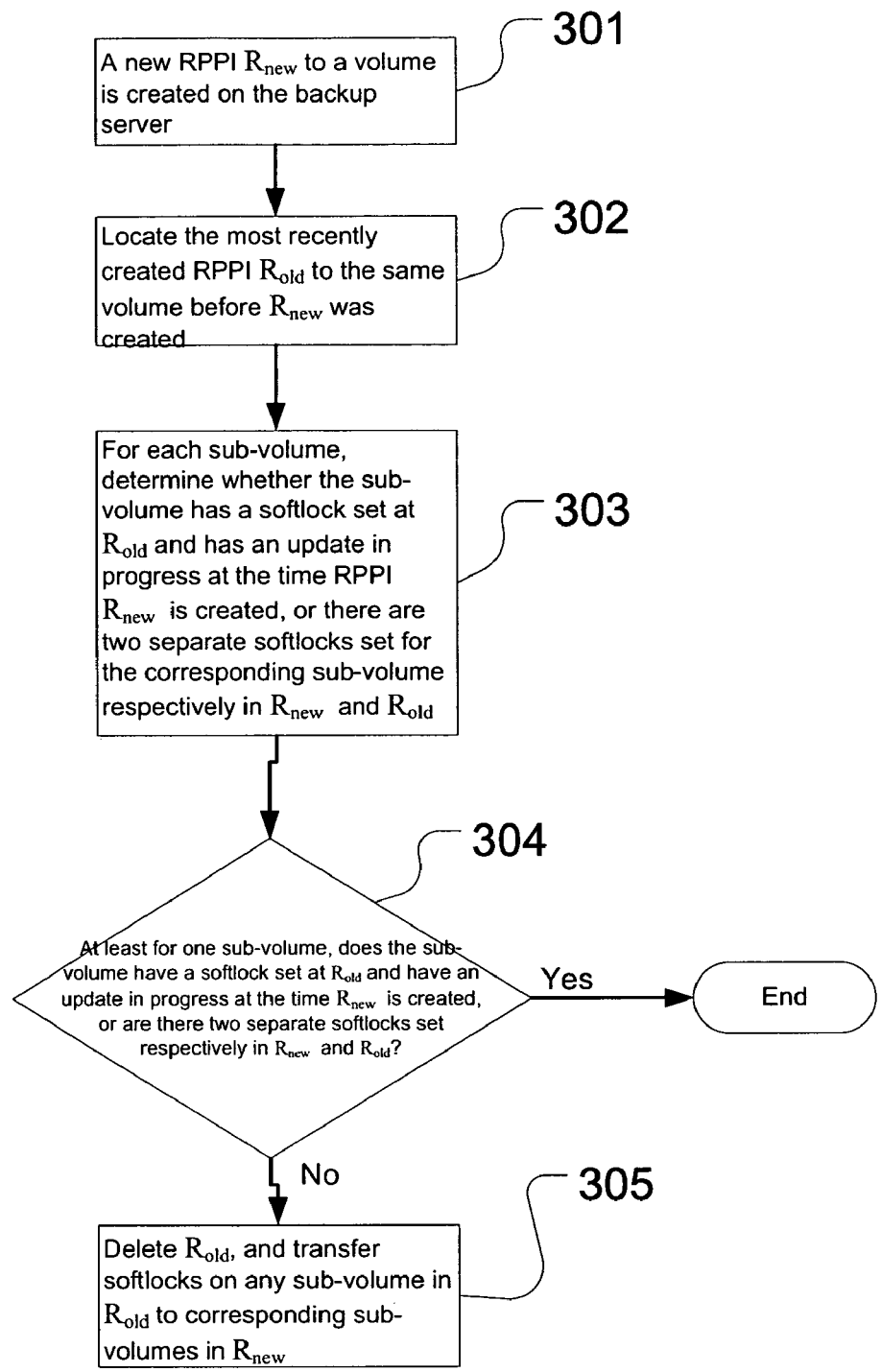
FIG. 3 is a flow diagram illustrating a process of reducing the number of RPPIs on a backup server.

FIG. 3 is a flow diagram illustrating the process of reducing the number of RPPIs on a backup server, according to an embodiment of the invention. At block 301, a new RPPI $R_{new}$ of a volume is created on the backup server. Upon the creation of $R_{new}$, the process locates the most recently created RPPI $R_{old}$ of the same volume before $R_{new}$ was created (at block 302). At block 303, for each sub-volume, the process determines whether a subvolume has a softlock set at Row and has an update in progress at the time RPPI $R_{new}$ is created, or there are two separate softlocks set for the corresponding sub-volume respectively in $R_{new}$ and $R_{old}$. If either condition obtains at block 304, the process ends and $R_{old}$ cannot be deleted, because $R_{new}$ and $R_{old}$ are holding two different historical versions of the particular sub-volume. Otherwise, if none of the sub-volumes has separate softlocks set in $R_{new}$ and $R_{old}$ respectively, and if no sub-volume with softlock set in $R_{old}$ has an update in progress at the time of the creation of $R_{new}$, then at block 305, RPPI $R_{old}$ may be deleted, thus reducing the total number of RPPIs maintained for the volume on the backup server. Before $R_{old}$ is deleted, the softlock on any sub-volume in $R_{old}$ needs to be transferred to the corresponding sub-volume in $R_{new}$, indicating that $R_{new}$ is holding the particular historical version of the corresponding sub-volume once held by $R_{old}$. In one embodiment, and by way of illustration and not restriction, if a softlock is implemented as including data to uniquely identify a particular sub-volume of a particular RPPI, the softlock may be transferred from $R_{old}$ to $R_{new}$ by modifying the data such that the modified data identifies the particular sub-volume in $R_{new}$. Yet another way to transfer a softlock is to create a new softlock based on the old one and remove the old one. A softlock may be implemented as including extra information such as when the softlock is created and why it is created, such that even after a softlock is transferred from $R_{old}$ to $R_{new}$, some original information regarding the softlock is retained.

In an embodiment of the invention, each softlock may correspond to an application that is holding the particular version of the sub-volume to which the softlock is attached. Each time a new application accesses to the particular version of the sub-volume, a new softlock is added; conversely, each time one of the applications releases the particular version of the sub-volume, the corresponding softlock is deleted. In one embodiment, a particular RPPI may not be deleted before all of the applications release the particular version of any and all sub-volumes uniquely contained in that RPPI. If, however, a particular historical backup version of a sub-volume may be deleted, upon its deletion, the corresponding RPPI is compared with its two temporally adjacent RPPIs (the one created immediately before the creation of the corresponding RPPI and the one created immediately after) according to the above discussed process to determine whether any one may be deleted.

Note that above discussion uses the terms "volumes" and "sub-volumes" only for purposes of illustration, not limitation.

Figures 4A, 4B, 4C, 4D, 4E:
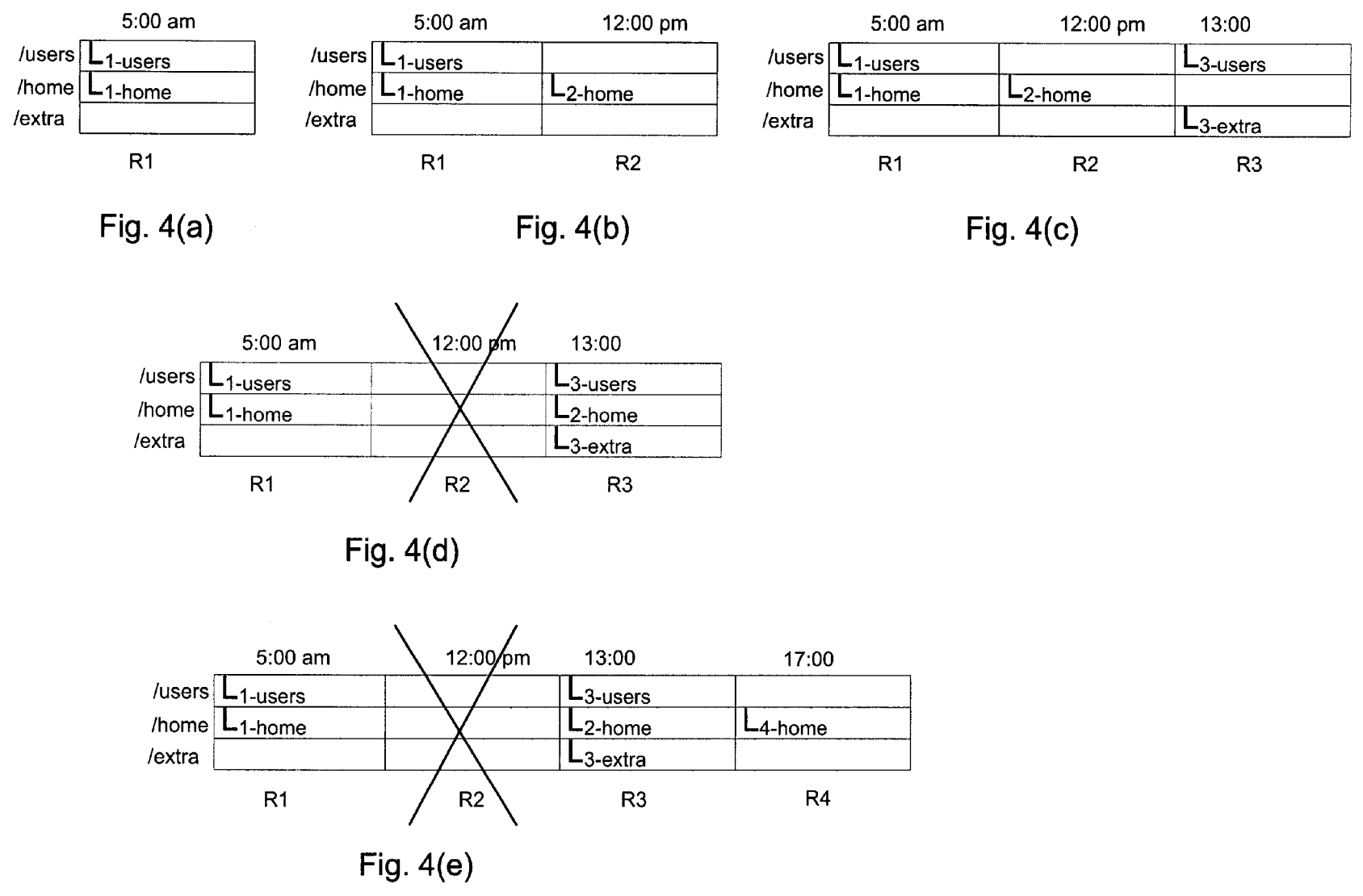

FIGS. 4(a)-4(e) illustrate an example of an application of the present invention on a backup server, such as a filer. It is assumed for the purpose of description that a volume v1 has three sub-volumes: "/users", "/home", and "/extra". FIG. 4(a) shows an update of the volume at 5:00 am. Since the update changes sub-volumes "/user" and "/home", the RPPI $R_1$ created at 5:00 am has a softlock $L_{1\text{-}users}$ set on "/users" and a softlock $L_{1\text{-}home}$ set on "/home". FIG. 4(b) shows an update of the volume at 12:00 pm, which updates sub-volume "/home". An RPPI $R_2$ is created at 12:00 pm and has a softlock $L_{2\text{-}home}$ set on "/home". Upon the creation of $R_2$, the process shown in FIG. 3 and discussed above runs and determines whether $R_1$ may be deleted in view of the creation of $R_2$. However, since sub-volume "/home" has a softlock set both in $R_1$ and $R_2$, $R_1$ cannot be deleted.

FIG. 4(c) shows an update of the volume at 13:00. Because the update updates sub-volumes "/users" and "/extra", the RPPI $R_3$ created at 13:00 has a softlock $L_{3\text{-}users}$ set for "/users" and a softlock $L_{3\text{-}extra}$ for "/extra". Upon the creation of $R_3$, the process in FIG. 3 runs again to determine whether $R_2$ may be deleted. In this case, since none of the sub-volumes has softlock set both in $R_2$ and in $R_3$, $R_2$ may be deleted and softlock $L_{2\text{-}home}$ on "/home" is transferred to $R_3$. Thus, the volume has two RPPIs left (as shown in FIG. 4(d)) rather than three. The two RPPIs, however, still capture all of the previous updates of the volume, and no information is lost because of the deletion of $R_2$.

FIG. 4(e) shows an update of the volume at 17:00. Upon this update, RPPI $R_4$ is created. A softlock $L_{4\text{-}home}$ is set on sub-volume "/home" of RPPI $R_4$. Because both $R_4$ and $R_3$ have softlock set on sub-volume "/home", $R_3$ cannot be deleted. However, if the 12:00 pm backup copy of sub-volume "/home" is deleted (assuming no application is holding that version of sub-volume "/home"), $R_3$ will not have softlock set on "/home", and $R_3$ may be completely deleted because both "/users" and "/extra" do not have softlock set in $R_4$. Thus, by applying the present invention in this scenario, $R_3$ may be removed, and the backup server only has two RPPIs left: $R_1$ and $R_4$.

Note the present invention may also be used outside of the backup context. For example, it may be applicable as a way to reduce RPPIs created on a storage server, e.g., a NetApp filer. The above discussion of the present invention in the context of a backup system does not in any way limit the scope of the present invention. In addition, the technique described above also works for both write out-of-place file systems and write in-place file systems. Any description using a backup server with write out-of-place property in the specification is only for illustration, not restriction purposes.

Figure 1:
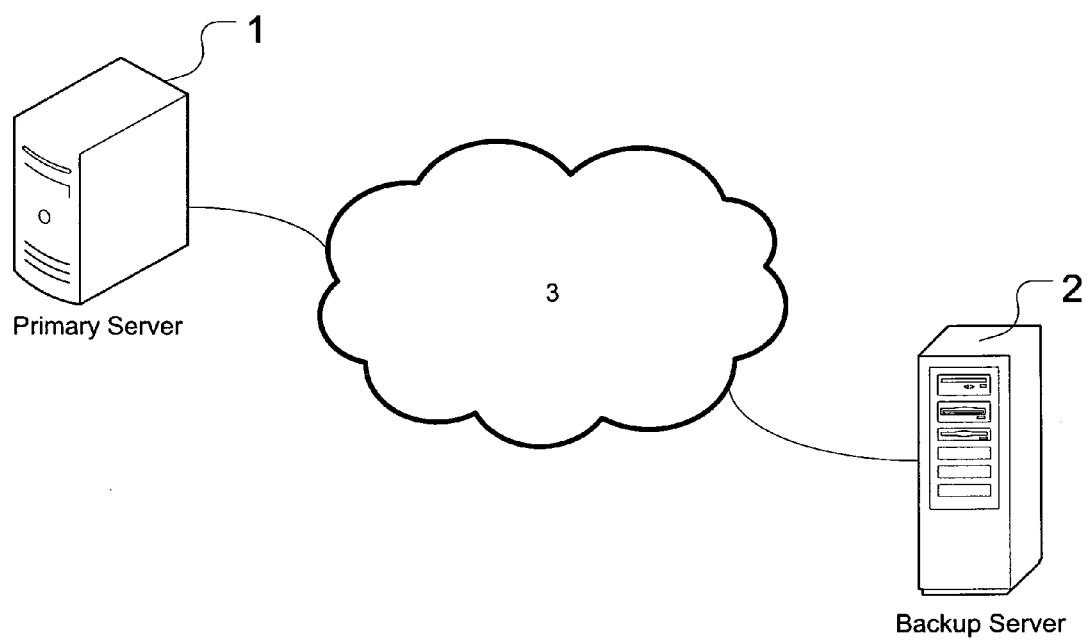
FIG. 1 illustrates a network environment in which a storage server is deployed as a backup server.
Figure 5:
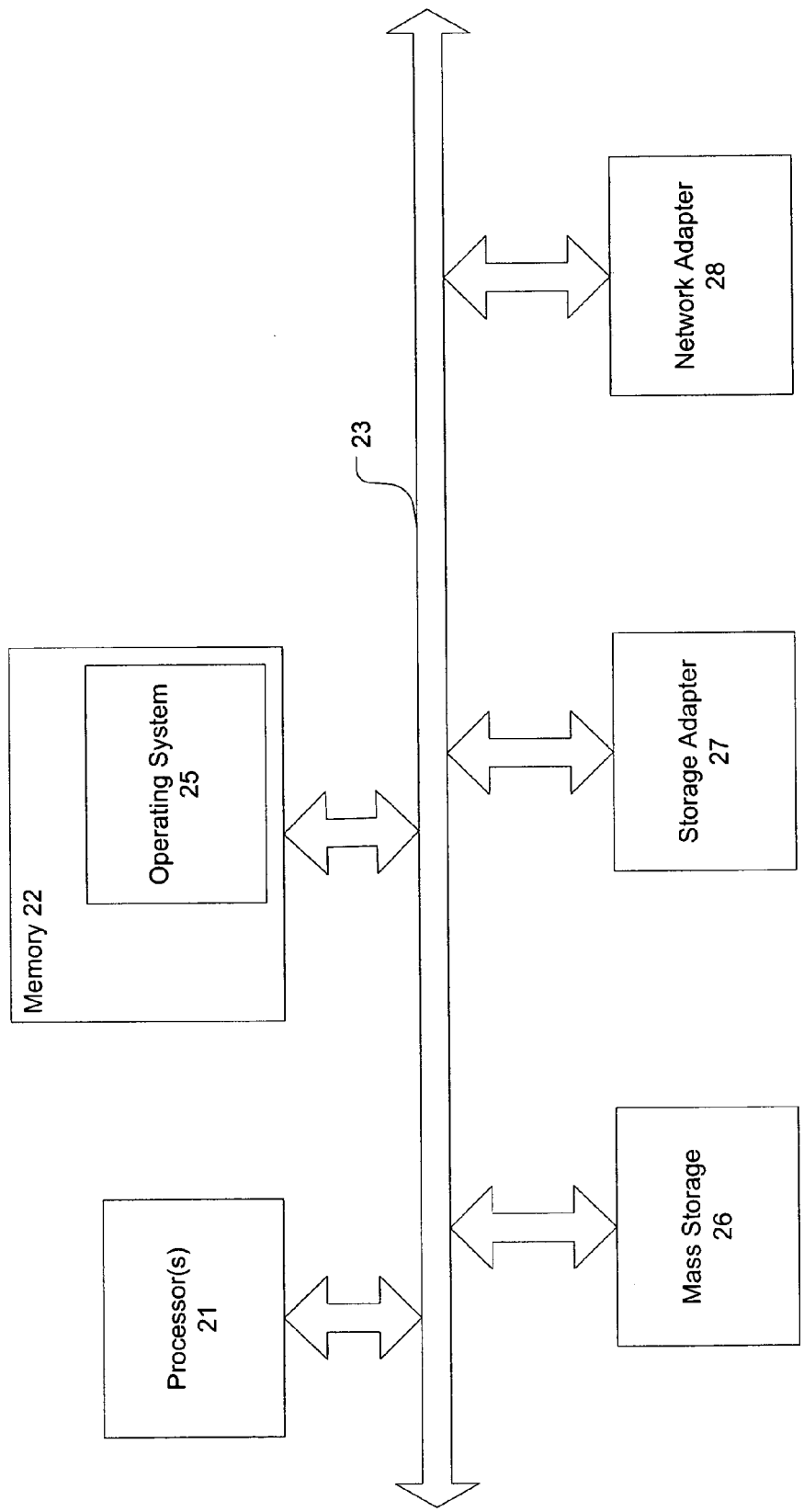
FIG. 5 is a high-level block diagram of a storage server.

FIG. 5 is a high-level block diagram of the backup storage server 2 of FIG. 1, according to certain embodiments of the invention. Certain standard and well-known components which are not germane to the present invention are not shown. The storage server 2 includes one or more processors 21 coupled to a bus system 23.

The bus system 23 in FIG. 5 is an abstraction that represents any one or more physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), I2C bus, or an Institute of Electrical and Electronics Engineers (IEEE) standard 1394 bus (sometimes referred to as "Firewire").

The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes memory 22 coupled to the bus system 23. The memory 22 represents any form of random access memory (RAM), read-only memory (ROM), flash memory, or a combination thereof. Memory 22 stores, among other things, the operating system 25 of the storage server 2, which may implement at least some of the technique described above.

Also connected to the processors 21 through the bus system 23 are a mass storage device 26, a storage adapter 27, and a network adapter 28. Mass storage device 26 may be or include any conventional medium for storing large quantities of data in a non-volatile manner, such as one or more disks. The storage adapter 27 allows the storage server 2 to access the storage subsystem and may be, for example, a Fibre Channel adapter or a SCSI adapter. The network adapter 28 provides the storage server 2 with the ability to communicate with remote devices such as a primary server 1 over a network 3 and may be, for example, an Ethernet adapter or a Fibre Channel adapter.

Memory 22 and mass storage device 26 store software instructions and/or data, which may include instructions and/or data used to implement the techniques introduced here. These instructions and/or data may be implemented as part of the operating system 25 of the storage server 2.

Thus, a method and apparatus for reducing the number of RPPIs created for a file system on a storage server have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   operating, in a file server comprising a data processing system, a write out-of-place file system, the file system comprising at least one subset;
   maintaining a first read-only, persistent point-in-time image (RPPI) of the file system, wherein the first RPPI is created upon a first update of the file system, wherein at least one subset of the first RPPI has a softlock created to indicate an update on the corresponding subset of the file system by the first update of the file system or another update of the file system that occurred before the first update;
   creating a second RPPI of the file system corresponding to a second update of the file system, wherein, for each subset of the file system updated by the second update, a softlock is created and associated with the corresponding subset of the second RPPI to indicate an update on said subset of the file system by the second update of the file system;
   determining, for each subset of the file system, whether there are a first softlock created for the corresponding subset of the first RPPI and a second softlock created for the corresponding subset of the second RPPI;
   deleting the first RPPI of the file system in response to determining that none of the subsets of the file system has a first softlock created for the corresponding subset of the first RPPI and a second softlock created for the corresponding subset of the second RPPI, wherein the second RPPI is not modified; and
   upon deleting the first RPPI, transferring each softlock created for the first RPPI to the second RPPI such that a softlock associated with a subset of the first RPPI is associated with the corresponding subset of the second RPPI after the transference.

2. The method of claim 1, wherein the file system comprises a volume and each said subset comprises a directory directly under a root directory of the volume.

3. The method of claim 1, wherein each RPPI of the file system references at least part of the file system when the RPPI is created, instead of duplicating said part of the file system.

4. The method of claim 1, wherein a subset of an RPPI may not be deleted or modified if a softlock has been created for the subset of the RPPI.

5. The method of claim 4, wherein a softlock is created for a subset of an RPPI to indicate that either the subset is updated or the subset is associated with an application.

6. A machine-readable storage medium having sequences of instructions stored therein which, when executed by a processor of a computer, cause the processor to perform a process comprising:
   maintaining in a file server a plurality of read-only, persistent point-in-time images (RPPIs) of a write out-of-place file system, the file system comprising at least one subset, wherein each RPPI is created upon an update of the file system and includes a subset in the RPPI corresponding to each subset in the file system, wherein the subset in each RPPI has a softlock created to indicate an update on the corresponding subset of the file system, and each RPPI references at least part of the file system when the RPPI is created, instead of duplicating said part of the file system; and
   determining whether, for each subset of a first RPPI from the plurality of RPPIs, an identical subset exists in a second RPPI from the plurality of RPPIs without modifying the another RPPI, wherein determining comprises determining, for each subset of the filesystem, whether there are a first softlock created for the corresponding subset of the first RPPI and a second softlock created for the corresponding subset of the second RPPI;
   if data for each subset of the first RPPI is recoverable from an identical subset in another RPPI, deleting the first RPPI from the plurality of RPPIs of the file system; and
   upon deleting the first RPPI, transferring each softlock created for the first RPPI to the second RPPI such that the first softlock is associated with the corresponding subset of the second RPPI after the transference.

7. The machine-readable storage medium of claim 6, wherein the file system comprises a volume and each said subset comprises a directory directly under a root directory of the volume.

8. A storage server comprising:
a processor;
a network interface through which to communicate with a client;
a storage interface through which to access a plurality of mass storage devices on behalf of the client;
and a memory coupled to the processor, the memory storing instructions which, when executed by the processor, cause the storage server to perform a process comprising:
operating a file system, the file system comprising at least one subset;
maintaining a first read-only, persistent point-in-time image (RPPI) of the file system, wherein the first RPPI is created upon a first update of the file system, wherein at least one subset of the first RPPI has a softlock created to indicate an update on the corresponding subset of the file system by the first update of the file system or another update of the file system that occurred before the first update;
creating a second RPPI of the file system corresponding to a second update of the file system, wherein, for each subset of the file system updated by the second update, a softlock is created and associated with the corresponding subset of the second RPPI to indicate an update on said subset of the file system by the second update of the file system;
determining, for each subset of the file system, whether there are a first softlock associated with the corresponding subset of the first RPPI and a second softlock associated with the corresponding subset of the second RPPI;
deleting the first RPPI of the file system if none of the subsets of the file system has a first softlock associated with the corresponding subset of the first RPPI and a second softlock associated with the corresponding subset of the second RPPI, wherein the second RPPI is not modified; and
upon deleting the first RPPI, for each softlock associated with a subset of the first RPPI, creating a corresponding softlock associated with the corresponding subset of the second RPPI.

9. The storage server of claim 8, wherein the file system comprises a volume and each said subset comprises a directory directly under a root directory of the volume.

10. The storage server of claim 9, wherein each RPPI of the file system references at least part of the file system when the RPPI is created, instead of duplicating said part of the file system.

11. The storage server of claim 10, wherein a subset of an RPPI may not be deleted or modified if a softlock is associated with the subset of the RPPI.

12. The storage server of claim 11, wherein a softlock is created for a subset of an RPPI to indicate that either the subset is updated or the subset is associated with an application.

* * * * *